US011488229B2

(12) United States Patent
Suzuki

(10) Patent No.: US 11,488,229 B2
(45) Date of Patent: Nov. 1, 2022

(54) INFORMATION PROCESSING DEVICE FOR CONTENT RECOMMENDATION

(71) Applicant: RakuRaku Ltd., Tokyo (JP)

(72) Inventor: Ryoichi Suzuki, Tokyo (JP)

(73) Assignee: RakuRaku Ltd., Tokyo (JP)

( * ) Notice: Subject to any disclaimer, the term of this patent is extended or adjusted under 35 U.S.C. 154(b) by 0 days.

(21) Appl. No.: 17/417,551

(22) PCT Filed: Dec. 25, 2019

(86) PCT No.: PCT/JP2019/050878
§ 371 (c)(1),
(2) Date: Jun. 23, 2021

(87) PCT Pub. No.: WO2020/138192
PCT Pub. Date: Jul. 2, 2020

(65) Prior Publication Data
US 2022/0044301 A1     Feb. 10, 2022

(30) Foreign Application Priority Data

Dec. 25, 2018   (JP) .............................. JP2018-241325

(51) Int. Cl.
*G06Q 30/00*     (2012.01)
*G06Q 30/06*     (2012.01)
(Continued)

(52) U.S. Cl.
CPC ..... *G06Q 30/0631* (2013.01); *G06F 16/9536* (2019.01); *G06F 16/9558* (2019.01); *G06Q 30/0641* (2013.01)

(58) Field of Classification Search
CPC ............ G06Q 30/0631; G06Q 30/0641; G06F 16/9558; G06F 16/9536
(Continued)

(56) References Cited

U.S. PATENT DOCUMENTS

2013/0304732 A1   11/2013   Tateno
2013/0332469 A1*  12/2013   Nakamura ............ G06F 16/954
                                                    707/748

FOREIGN PATENT DOCUMENTS

JP     2013-171334 A    9/2013
JP     2013-235542 A    11/2013
(Continued)

OTHER PUBLICATIONS

G. Antolić and L. Brkić, "Recommender system based on the analysis of publicly available data," 2017 40th International Convention on Information and Communication Technology, Electronics and Microelectronics (MIPRO), 2017, pp. 1379-1384, doi: 10.23919/MIPRO.2017.7973637. (Year: 2017).*

(Continued)

*Primary Examiner* — Anand Loharikar
(74) *Attorney, Agent, or Firm* — Studebaker & Brackett PC

(57) ABSTRACT

The purpose of the present invention is to sway a user to increase purchase desire, by constructing a system that successively links related information to one piece of information, thereby making it easy to grasp related information. In the present invention, a reception unit 101 receives an evaluation of a user U2 with respect to content C1 recommended by a user U1, and a recommendation by the user U2 about content C2 determined by the user U2 to be related to the content C1. A management unit 102 manages user information of the user U2 in association with content information of the content C1 and content information of the content C2. When a user U3 accesses the content C1, a presentation unit 103 presents to the user U3, on the basis of the mutual correspondence relationship of these pieces of information, at least one piece of information from among (Continued)

these pieces of information. Due to the foregoing, the present invention solves the abovementioned problem.

5 Claims, 14 Drawing Sheets

(51) Int. Cl.
*G06F 16/955* (2019.01)
*G06F 16/9536* (2019.01)

(58) Field of Classification Search
USPC .............................................. 705/26.1–27.2
See application file for complete search history.

(56) References Cited

FOREIGN PATENT DOCUMENTS

| | | |
|---|---|---|
| JP | 2013-254288 A | 12/2013 |
| JP | 2014-197292 A | 10/2014 |

OTHER PUBLICATIONS

International Search Report issued in PCT/JP2019/050878; dated Mar. 31, 2020.
"Notice of Reasons for Refusal" Office Action issued in JP 2020-534639; mailed by the Japanese Patent Office dated Oct. 13, 2020.
"Decision to Grant a Patent" Office Action issued in JP 2020-534639; mailed by the Japanese Patent Office dated Mar. 9, 2021.

\* cited by examiner

INFORMATION PROCESSING DEVICE FOR CONTENT RECOMMENDATION

TECHNICAL FIELD

The present invention relates to an information processing device.

BACKGROUND ART

Conventionally, a user utilizing a community site available on the Internet is able to efficiently acquire information provided by other users having the knowledge of predetermined books and information regarding other books relating to the predetermined books. In the field described above, for example, one device is proposed. The device analyzes what is posted on the community site. The device then recommends a user who is thought to have the knowledge about the predetermined books (for example, see Patent Document 1).

Patent Document 1: Japanese Unexamined Patent Application, Publication No. 2014-197292

DISCLOSURE OF THE INVENTION

Problems to be Solved by the Invention

However, conventional technologies including the technology described in Patent Document 1 merely generate and provide, to a user, recommended information mechanically analogized on the basis of histories of commercial products other users have bought. That is, in the course of generating the recommended information, the histories of commercial products other users have bought are taken into account. However, what the other users have evaluated on the commercial products actually bought by the other users are not taken into account. That is, even if another user who has bought a commercial product is not satisfied with the commercial product, the history of the other user having "bought" the commercial product is solely adopted as information serving as a reason for generating the recommended information when the recommended information is to be generated. Therefore, even when users have bought commercial products recommended in such recommended information, the users may not be often satisfied with the commercial products. For example, as illustrated on a left side in FIG. 14, conventionally, as to one commercial product (for example, a commercial product A), reviews by a plurality of users (for example, Suzuki-san, Tanaka-san, Saito-san, and Yamamoto-san) are accumulated. Furthermore, as illustrated on the left side in FIG. 14, reviews on the commercial products (for example, the commercial products A to D) recommended by one user (for example, Suzuki-san) are accumulated. Furthermore, for conventional recommended information, technologies based on artificial intelligence (AI), for example, are utilized, instead of using opinions of "actual human beings". Therefore, when recommended information is to be generated, information such as views on life, senses of value or tastes that the "actual human beings" have are not taken into account. As a result, users are neither able to feel empathy with what the recommended information describes, nor increase their buying desire. As described above, the conventional recommended information has not yet been able to solve such problems as "it is impossible to cross the uncanny valley" and "there is no element of surprise". Therefore, even when a user is provided with such recommended information, the user is still in a situation where the user is less likely to be swayed to increase purchase desire.

In view of the situations described above, an object of the present invention is to provide a method making it possible to sway a user to increase purchase desire, by constructing a system that successively links related information to one piece of information, thereby making it easy to grasp the related information.

Means for Solving the Problems

To achieve the object described above, an information processing device according to an aspect of the present invention includes: reception section that receives an evaluation on a first content by a first user, and a recommendation on a second content determined by the first user to be related to the first content; management section that manages first user information indicative of the first user, first content information indicative of the first content, and second content information indicative of the second content in association with each other, the first user information, the first content information, and the second content information being contained in the evaluation and the recommendation received by the reception section; and presentation section that presents, when a second user accesses the first content, to the second user, at least one piece of information selected from among the first user information, the first content information, and the second content information, on the basis of a mutual correspondence relation among the first user information, the first content information, and the second content information managed by the management section.

Effects of the Invention

According to the present invention, constructing a system that successively links related information to one piece of information, thereby making it easy to grasp the related information, makes it possible to sway a user to increase purchase desire.

BRIEF DESCRIPTION OF THE DRAWINGS

FIG. 13 is a view illustrating how the user terminal displays data of an image indicative of content that a user U has searched for.

PREFERRED MODE FOR CARRYING OUT THE INVENTION

An embodiment of the present invention will now be described herein with reference to the accompanying drawings.

An outline of a service (hereinafter referred to as "the present service") that is subject to the application of an information processing system (see FIG. 5 described later) to which a server 1 according to the embodiment of an information processing device of the present invention is applied will first be described with reference to FIGS. 1 to 4.

Figure 1:
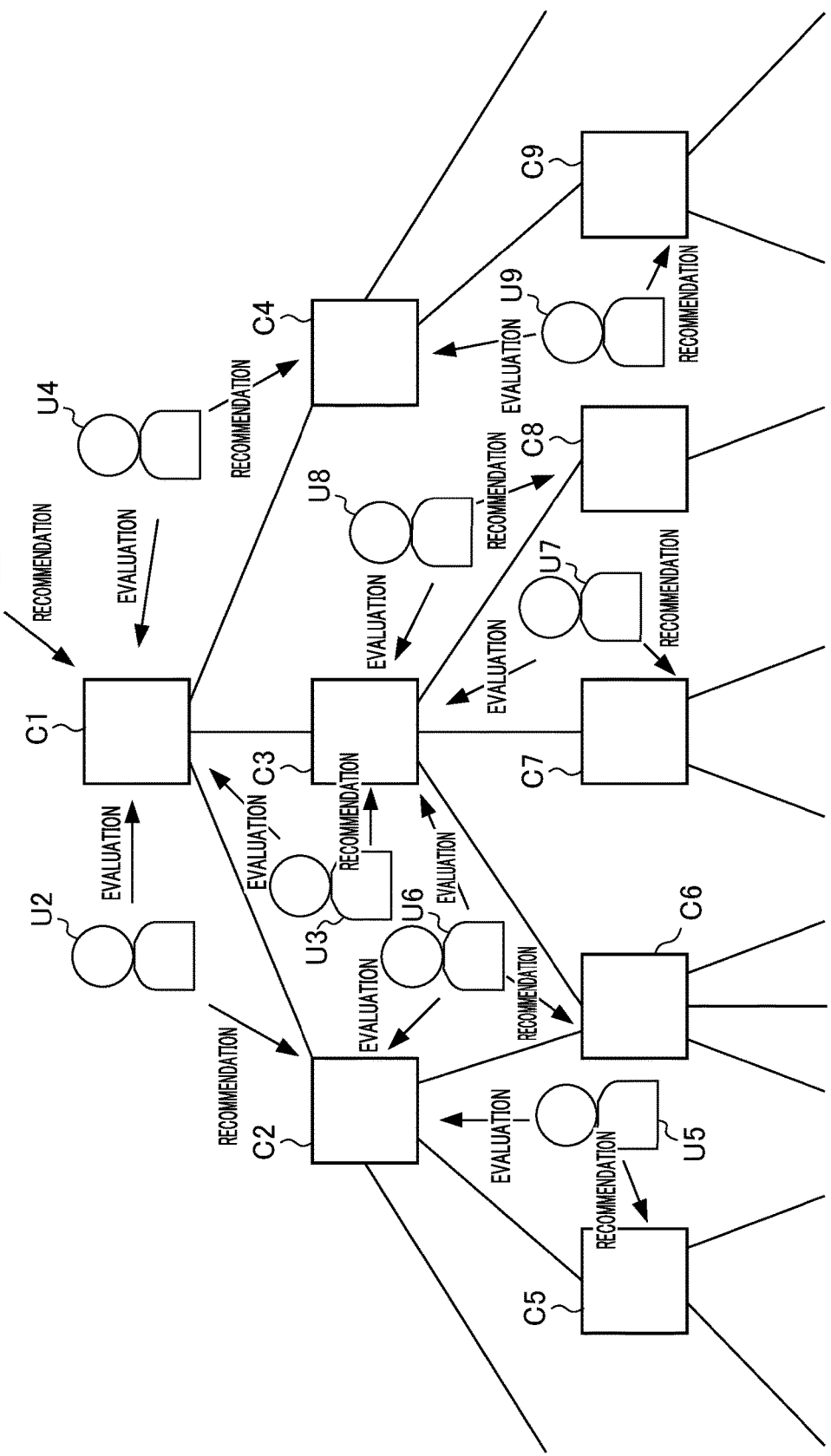
FIG. 1 is a view illustrating details of a concept of a present service that is subject to the application of an information processing system to which a server according to an embodiment of an information processing device of the present invention is applied.

FIG. 1 is a view illustrating details of a concept of the present service that is subject to the application of the information processing system to which the server according to the embodiment of the information processing device of the present invention is applied.

FIG. 1 illustrates users U1 to U9 representing users of the present service and content C1 to C9 respectively recommended by the users U1 to U9. The term "content" used in here refers to a general idea in the form of text, sound, or video representing so-called contents of a medium, for example. For example, books, such as novels and cartoons, and copyrighted materials expressed as movies and videos, which are provided as commercial products to users U, are regarded as content. The present service differs from so-called review services that have been conventionally provided via Web sites and in the form of application software (hereinafter referred to as an "App"). The present service is a service achieved when reviews on content C by the users U successively link the content C to each other. For example, in ordinary conversations that people make, when a person A talks about a movie called "a", another person B who has listened to what the person A says may make a suggestion like "If you liked "a", you can also watch a "b".". Furthermore, another person C who has listened to what the other person B says may further make a suggestion like "If you were impressed with the "b", I recommend you watch a "c".". Another person D who has listened to what the other person C says may still further give an opinion like "If you loved the "c", my absolute recommendation is a "d".". As described above, in ordinary conversations that people make, a conversation that someone has made without any particular intention (for example, a conversation about a movie) may be successively linked to other conversations among a plurality of persons. The present service is a service achieved by a system that allows "a single conversation to be successively linked to other conversations", as described above. Furthermore, the present service makes it possible to link the users U to each other with a social networking service (SNS).

Specifically, for example, as illustrated in FIG. 1, the user U1 first recommends the content C1 in the present service. The users U2 to U4 who have seen the recommendation respectively evaluate the recommended content C1. The users U2 to U4 then respectively recommend the content C2 to C4 because the users U2 to U4 have respectively determined by themselves that the content C2 to C4 relate to the content C1. The users U5 and U6 who have seen the recommendation by the user U2 respectively evaluate the recommended content C2. The users U5 and U6 then respectively recommend the content C5 and C6 because the users U5 and U6 have respectively determined by themselves that the content C5 and C6 relate to the content C2. Furthermore, the users U6 to U8 who have seen the recommendation by the user U3 respectively evaluate the recommended content C3. The users U6 to U8 then respectively recommend the content C6 to C8 because the users U6 to U8 have respectively determined that the content C6 to C8 relate to the content C3. In this case, the user U6 recommends content C (the content C6) because the user U6 has determined that the content C (the content C6) relates to a plurality of content C (both the content C2 and the content C3). Furthermore, the user U9 who has seen the recommendation by the user U4 evaluates the recommended content C4. The user U9 then recommends the content C9 because the user U9 has determined that the content C9 relates to the content C4. As described above, according to the present service, it is possible to allow "links" among the content C to last longer, as can be seen in a tree diagram illustrated in FIG. 1. As a result, it is possible to make it easy to grasp a mutual relationship among the plurality of content C.

When a user U utilizing the present service evaluates (posts a review on) content C recommended by another user U, the user U recommends another content C. That is, to evaluate (to post a review on) content C, the user U first searches for and selects another content C that the user U recommends. The user U then posts a review on the content C that user U evaluates. That is, in the present service, a flow is strictly observed as follows: (1) another content C to be recommended is searched for, (2) the other content C to be recommended is selected, and (3) a review on content C that is subject to evaluation is posted. In the present service, the flow from (1) to (3) described above is strictly observed. Therefore, if there is no content C that the user U recommends, the user U is not able to make an evaluation (is not able to post a review). By providing the system as described above, it is possible to utilize evaluations (posted reviews) to successively link content C.

The user U uses special application software (hereinafter referred to as a "special App") installed beforehand in a smart phone (hereinafter referred to as a "user terminal") that the user U possesses, for example, to utilize the present service. However, a method of utilizing the present service is not particularly limited. For example, such a method may be adopted that the present service is utilized through a browser function of a user terminal. The user U follows the flow from (1) to (3) described above to perform input operations on each of graphical user interfaces (GUIs) to be displayed on the user terminal.

Figure 2:
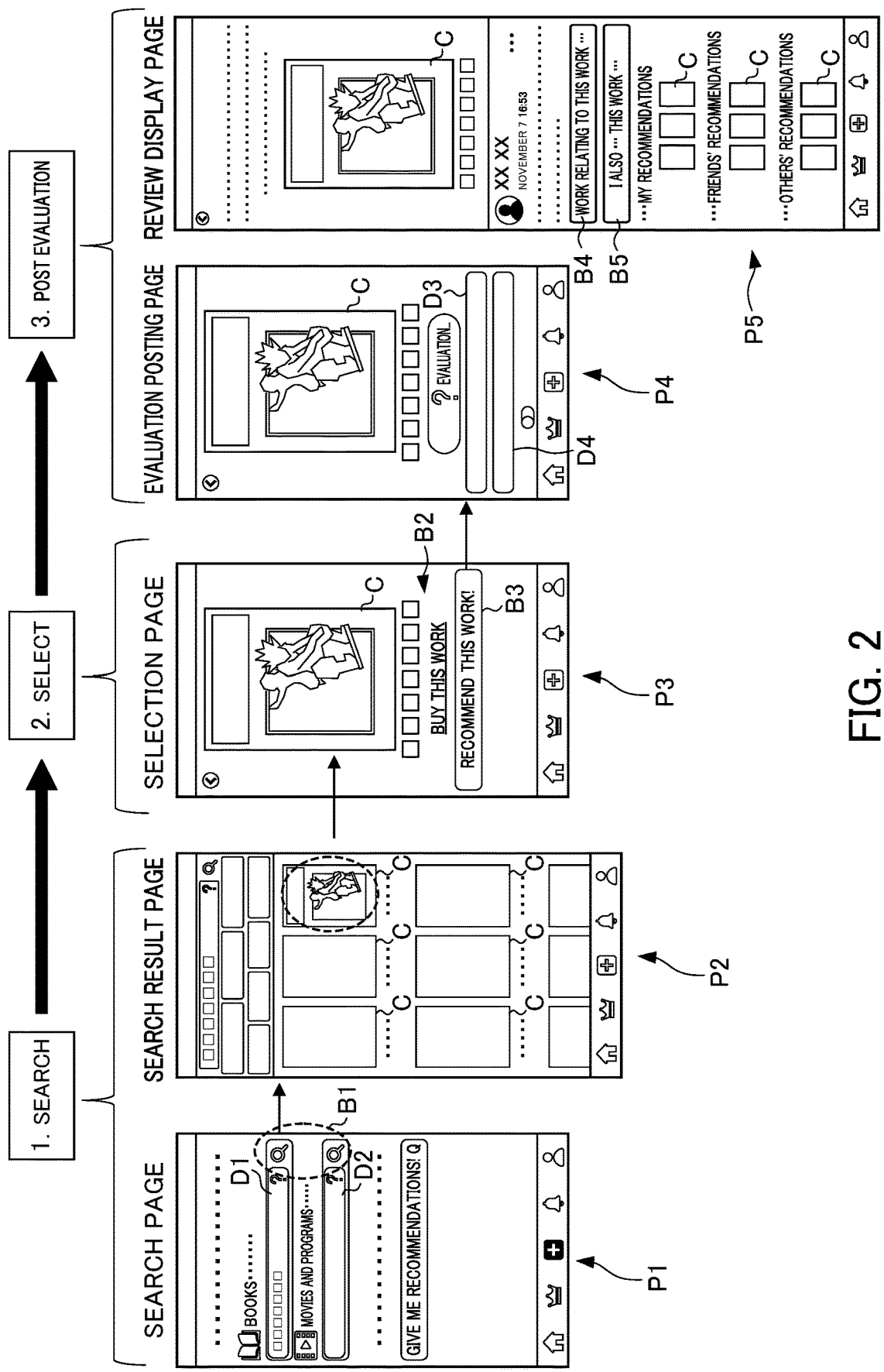
FIG. 2 is a view illustrating a specific example of various types of graphical user interfaces (GUIs) to be displayed on a user terminal when a user evaluates content.

FIG. 2 is a view illustrating a specific example of various types of GUIs to be displayed on the user terminal when the user evaluates content. In the present embodiment, as an example of an evaluation on content C, an example of an evaluation on a book, movie, or program is illustrated. The term "program" refers to the contents of a program provided to the users U with a method such as television broadcasting, radio broadcasting, or distributing via the Internet.

To allow the user U to evaluate content C, the user terminal first displays a page P1 (hereinafter referred to as a "search page P1") used to make a search, as described above in (1). The search page P1 is at least provided with entry fields D1 and D2 and a button B1 indicated as "Give me recommendations! Q". When the user U intends to recommend content C that is a book, the user U enters a title or an author name as a search keyword in the entry field D1. The user U then presses the button B1. Furthermore, when the user U intends to recommend content C that is a movie or program, the user U enters a title as a search keyword in the entry field D1. The user U then presses the button B1. When the button B1 is pressed, referable content C are collectively searched for among a commonly utilized plurality of platforms (for example, book sales sites). As described above, upon the entry of a title or an author name in the entry field D1, or the entry of a title in the entry field D2, a search takes place. However, a search may take place with a search keyword other than a title or an author name.

Note herein that information indicative of content C to be searched for by a user U is stored in a server (for example, the server 1 in FIG. 5) managed by a service provider (not illustrated) providing the present service. The server always performs data crawling to always keep up to date the information indicative of the content C that the server is managing. Furthermore, the server does not store data of an image indicative of the content C. Therefore, it is possible to avoid a possibility of infringing a copyright of the content C. Furthermore, it is possible to avoid a burden on the server side, which may arise when the server stores all images of pages displaying content C. The server only stores a uniform resource locator (URL) indicative of data of an image of content C in each platform providing the content C. That is, when the user U uses a smart phone, for example, to request content C, a URL indicative of data of an image of a page displaying the content C (hereinafter referred to as an "image URL") is sent to the user terminal from a platform providing the content C. The user terminal then directly accesses the image URL, downloads the image of the page displaying the content C, and displays the image. Note that, details of the method of causing a user terminal to display an image of a page displaying content C will be described later with reference to FIG. 13.

Upon the entry of a search keyword in the entry field D1 or the entry field D2 on the search page P1, and the pressing of the button B1 for instructing the start of a search, the search for the content C is executed. A result of the search is then displayed. Specifically, the user terminal displays a page P2 (hereinafter referred to as a "search result page P2") that displays a result of a search, as described above in (1). The search result page P2 displays names of content C and data of images indicative of the content C, which have been hit through the search. Note that, as described above, the data of the images indicative of the content C, the images being displayed as the result of the search on the search result page P2, is acquired when the user terminal directly accesses image URLs provided from the server. Note that, although not illustrated, when the button indicated as "Give me recommendations! Q" on the search page P1 is pressed, a page for receiving a question from the user U is displayed. The page is provided with a check box for selecting a type (for example, book, movie, or program) of content C, an entry field for entering details of a question, and a button indicated as "Post". When the user U enters details of a question, and presses the button indicated as "Post", the question is made public.

The user U performs an operation of selecting content C that the user U recommends, from among the content C displayed as the result of the search on the search result page P2. Specifically, the user U performs an operation (for example, a tap operation) of selecting one that the user U recommends, from among the images indicative of the content C displayed as the result of the search. Therefore, the user terminal displays a page P3 (hereinafter referred to as a "selection page P3") that individually displays the selected content C. The selection page P3 is at least provided with a button B2 for buying the selected content C and a button B3 for recommending the selected content C to the other users U.

When the user U presses the button B3, the user terminal displays a page P4 (hereinafter referred to as an "evaluation posting page P4") for allowing the user U to evaluate (post a review on) the selected content C serving as a recommendation. The evaluation posting page P4 is provided with an entry field D3 for entering a title (a name) of content C that is subject to evaluation and an entry field D4 for entering and posting details of an evaluation (for posting a review). Note that, although not illustrated, when a button indicated as "? Evaluate" is pressed on the evaluation posting page P4, a list of emojis (pictorial symbols) available when evaluating content C is displayed. When the user U selects an emoji that the user U intends to use, from among the list, and posts an evaluation (a review), the emoji is displayed at a predetermined location on a time line described later or a review display page P5. This is a method for making an evaluation. The method is available instead of a method for making an evaluation using numbers (for example, five levels). With the method, it is possible to easily express a feeling of the user U, regarding content C.

When an evaluation is posted (a review is posted) with the details entered in the entry fields D3 and D4 on the evaluation posting page P4, the page P5 (hereinafter referred to as the "review display page P5") reflecting the details is generated per the content C. The review display page P5 is not one that simply suspends from a commercial product page, i.e., is not a review listed on an ordinary electronic commerce (EC) site, for example. The page will be individually generated per content C, similar to a so-called blog post.

On a lower portion of the review display page P5, a button B4 indicated as "Recommend work relating to this work!" and a button B5 indicated as "I also recommend this work!" are disposed.

The button B4 is a button that the user U presses when, immediately after the user U has seen an evaluation (a posted review), the user U recommends content C. When the user U presses the button B4, the user U is able to select content C serving as a recommendation, with a flow similar to the flow of (1) Search, (2) Select, and (3) Post an evaluation, as illustrated in FIG. 2. Note that a specific method of selecting content C serving as a recommendation will be described later.

The button B5 is a button that the user U presses when, after the user U has seen content C recommended by another user U, the user U recommends the same content C. Note that, a flow after the button B5 is pressed is similar to the flow from (1) to (3), as described above. Therefore, the description of the flow after the button B5 is pressed is omitted.

In the present service, pressing either the button B4 or B5 makes it possible to post content C serving as a recommendation. Furthermore, posting the content C serving as a recommendation makes it possible to link the content C to other content C to each other. Therefore, in the present service, positions and a method at and with which the buttons B4 and B5 are disposed on the GUI to be displayed on the user terminal are regarded as one of important factors. When the buttons B4 and B5 are disposed at appropriate positions on a GUI to be displayed on the user terminal, it is possible to expect that many users U willingly press the buttons B4 and B5. Therefore, other content C serving as recommendations because the other content C are determined to be related to content C, on the basis of a subjective view of each of users U, are sequentially accumulated in a predetermined database. In the database as described above, information is manually given by users, without utilizing artificial intelligence (AI).

The user U basically recommends another content C which relates to content C recommended by another user U. However, the user U may recommends another content C which relates to content C recommended by same user U. That is, the user U is able to link related work (content C the user U intends to recommend) with work posted before (content C that the user U has recommended so far).

Figure 3:
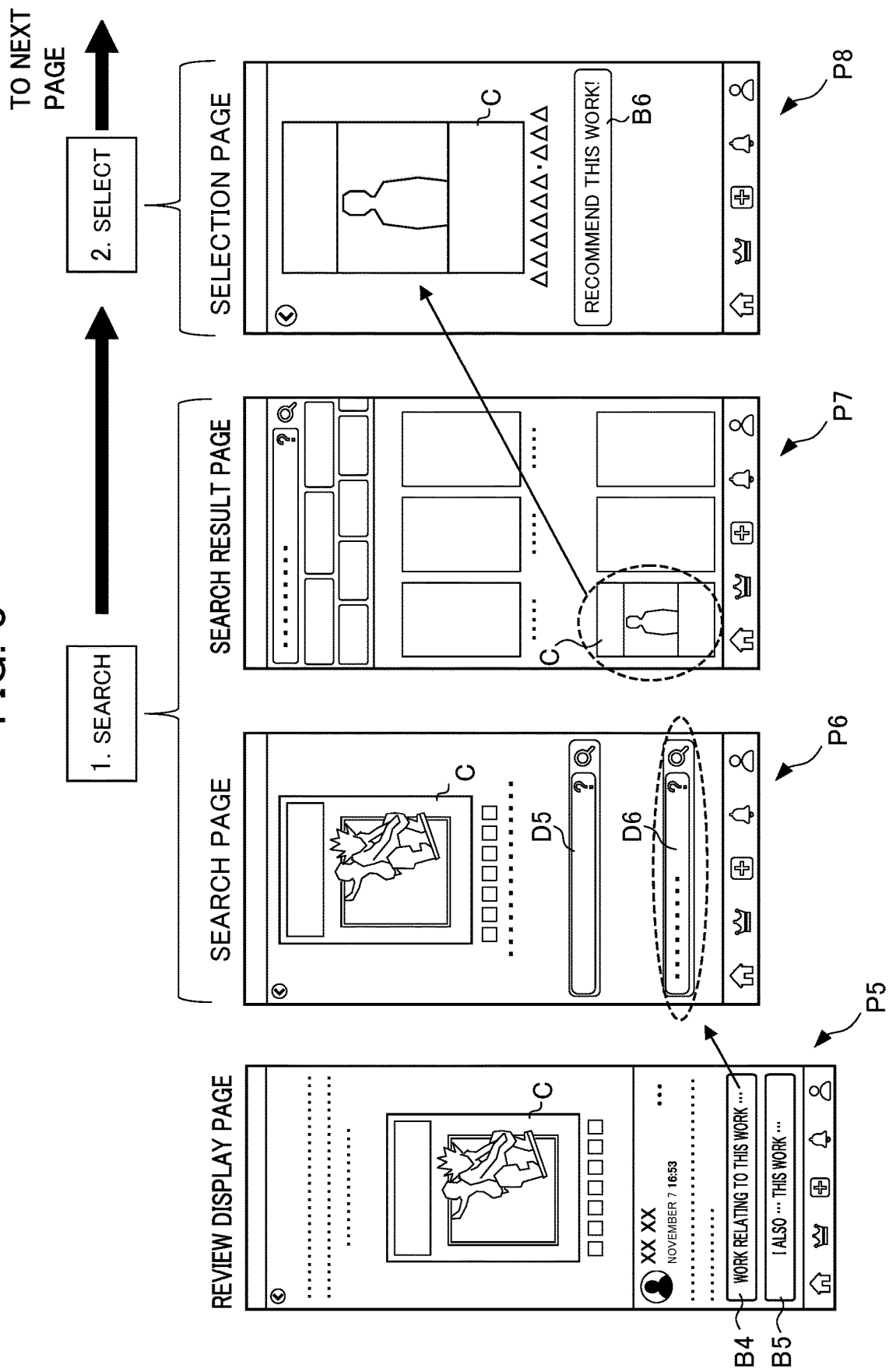
FIG. 3 is a view illustrating a specific example of various types of GUIs to be displayed on the user terminal when the user recommends content.
Figure 4:
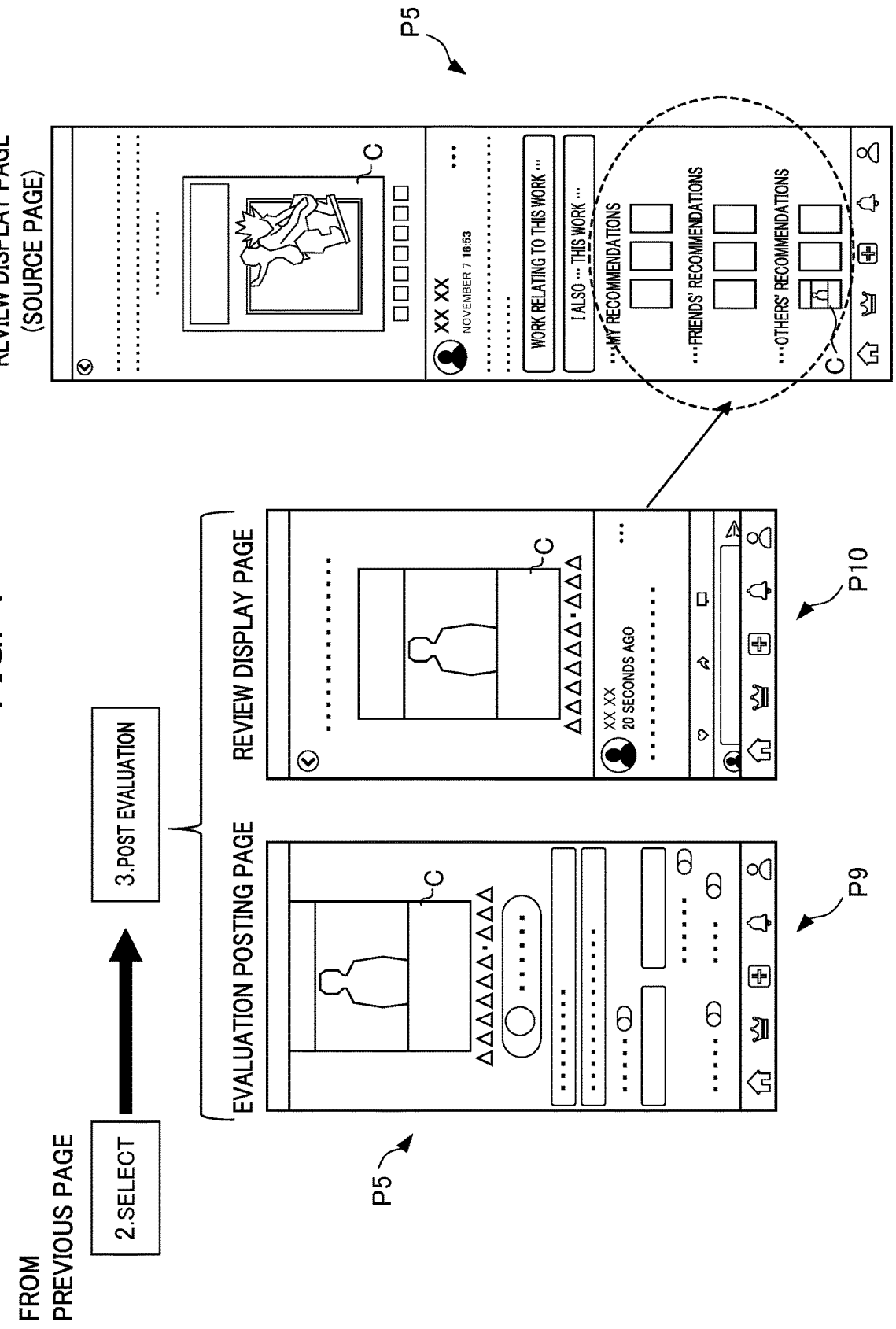
FIG. 4 is a view illustrating a specific example of various types of GUIs to be displayed on the user terminal when the user recommends the content.

FIGS. 3 and 4 are views each illustrating a specific example of various types of GUIs to be displayed on the user terminal when the user recommends content.

FIG. 3 illustrates the specific example of the GUIs to be displayed on the user terminal after the button B4 provided on the review display page P5 described above and indicated as "Recommend work relating to this work" is pressed. That is, when the button B4 provided on the lower portion of the review display page P5 illustrated at a left end in FIG. 3 is pressed, the user terminal displays a search page P6. Note that an aspect of the search page P6 is basically similar to the aspect of the search page P1 described above. Therefore, the detailed description of the search page P6 is omitted. The search page P6 is provided with entry fields D5 and D6 each for entering a search keyword, similar to the search page P1. Therefore, the user U is able to enter a search keyword in the entry field D5 or D6 to search for content C serving as a recommendation. That is, when a search keyword entered in the search page P6 hits content C, data of images indicative of the content C to which the search keyword has hit is listed on a search result page P7, for example. When one content C is selected, only the selected content C is displayed on a selection page P8. The selection page P8 is provided with a button B6 indicated as "Recommend this work!", similar to the button B3 provided on the selection page P3 described above. When the button B6 is pressed, the user terminal displays a page P9 (hereinafter referred to as an "evaluation posting page P9") for entering an evaluation on the content C, illustrated in FIG. 4.

FIG. 4 illustrates the specific example of the GUIs to be displayed on the user terminal after the button B6 provided on the selection page P8 in FIG. 3 and indicated as "Recommend this work!" is pressed. That is, when the content C serving as a recommendation is evaluated (a review is posted) from the evaluation posting page P9 illustrated at a left end in FIG. 4, details of the review is reflected on a review display page P10. Furthermore, simultaneously, the review display page P5, as illustrated at a right end in FIG. 4, also displays, as a thumbnail, data of an image indicative of the content C serving as a recommendation. The display is rearranged in a descending order of the number of "Like" indications provided in response to the posted reviews. The content C serving as a recommendation is classified into one of three categories described below, depending on who the poster is (the user U who has recommended the content C). That is, the content C is classified into one of the three categories that are (1) My recommendations relating to the book, (2) My friends' recommendations relating to the book, and (3) Others' recommendations relating to the book. That is, the content C serving as a recommendation is classified into the category (1) described above, when its poster is identical to the poster of the content C that is subject to evaluation. Furthermore, the content C serving as a recommendation is classified into the category (2) described above, when its poster is a follower (a so-called "friend") of the poster of the content C that is subject to evaluation. Furthermore, the content C serving as a recommendation is otherwise classified into the category (3) described above, when its poster is not following the poster of the content C that is subject to evaluation.

Furthermore, in the example in FIG. 4, "movies" regarded as content C are recommended, in response to the posted evaluation (the posted review) on the "book" regarded as the content C. As described above, according to the present service, information to be linked is not only limited to content C belonging to an identical category (for example, a book category only when content C is a book), but is relate to other categories (for example, a movie category other than the book category).

Figure 5:
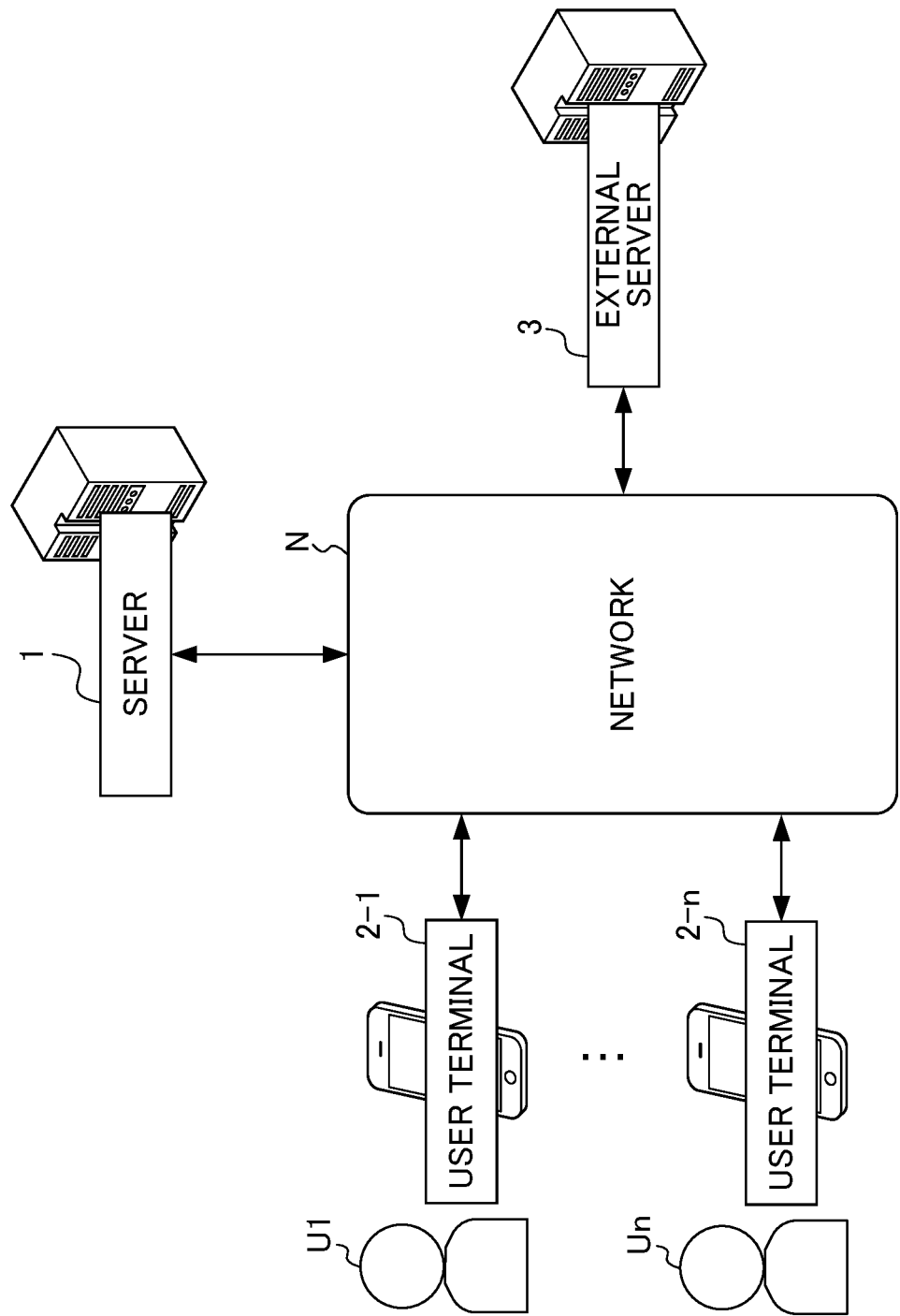
FIG. 5 is a view illustrating an example of a configuration of the information processing system to which the server according to the embodiment of the information processing device of the present invention is applied.

FIG. 5 is a view illustrating an example of a configuration of the information processing system to which the server according to the embodiment of the information processing device of the present invention is applied.

The information processing system illustrated in FIG. 5 is configured when the server 1, user terminals 2-1 to 2-$n$ (n is an integer value equal to or more than 1), and an external server 3 are coupled to each other via a predetermined network N such as the Internet.

The server 1 is an information processing device that the non-illustrated service provider manages. The server 1 appropriately communicates with the user terminals 2-1 to 2-$n$, respectively, to execute various types of processing achieving the present service.

The user terminals 2-1 to 2-$n$ are information processing devices that the users U operate. The user terminals 2-1 to 2-$n$ are personal computers, smart phones, and tablets, for example. Unless otherwise specifically distinguished from each other, the user terminals 2-1 to 2-$n$ will be hereinafter collectively referred to as "user terminals 2".

The external server 3 is an information processing device that a provider (not illustrated) of an external platform providing content manages. The external server 3 provides image URLs to the server 1 via the network N.

Figure 6:
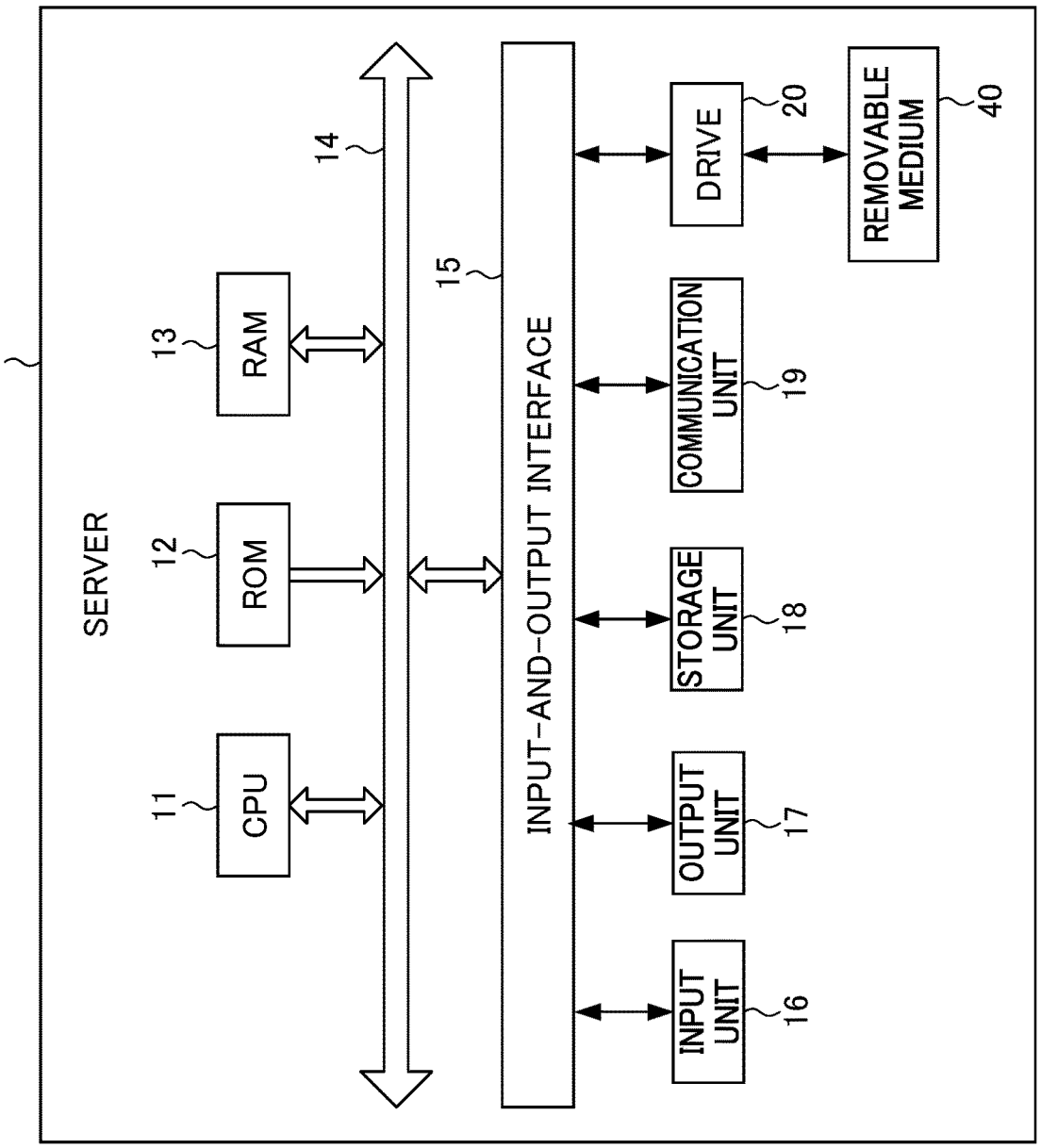
FIG. 6 is a block diagram illustrating a hardware configuration of the server in FIG. 5.

Next, a hardware configuration of the server 1 that executes various types of processing in the information processing system illustrated in FIG. 5 will be described. FIG. 6 is a block diagram illustrating the hardware configuration of the server in FIG. 5.

The server 1 includes a central processing unit (CPU) 11, a read only memory (ROM) 12, a random access memory (RAM) 13, a bus 14, an input-and-output interface 15, an input unit 16, an output unit 17, a storage unit 18, a communication unit 19, and a drive 20.

The CPU 11 runs programs recorded in the ROM 12 or programs loaded from the storage unit 18 to the RAM 13, and, in accordance with the programs, executes various types of processing. The RAM 13 appropriately stores, for example, data necessary for the CPU 11 to execute various types of processing.

The CPU 11, the ROM 12 and the RAM 13 are coupled to each other via the bus 14. The bus 14 is further coupled to the input-and-output interface 15. The input-and-output interface 15 is coupled to the input unit 16, the output unit 17, the storage unit 18, the communication unit 19, and the drive 20.

The input unit 16 is formed of hardware buttons of any type, for example, to accept various types of information. The output unit 17 is formed of a liquid crystal display of any type, for example, to output various types of information. The storage unit 18 is formed of a dynamic random access memory (DRAM), for example, to store various types of data. The communication unit 19 controls communications that take place among other devices (for example, the user terminals 2-1 to 2-n and the external server 3 in FIG. 5) via the network N including the Internet.

The drive 20 is provided as required. The drive 20 is appropriately attached with a removable medium 40 such as a magnetic disk, an optical disk, a magnetic optical disk, or a semiconductor memory. A program read from the removable medium 40 by the drive 20 is installed into the storage unit 18 as required. Furthermore, the removable medium 40 is able to store various types of data stored in the storage unit 18, similar to the storage unit 18.

Note that, although not illustrated, the user terminals 2-1 to 2-n and the external server 3 in FIG. 5 each also have a configuration basically similar to the hardware configuration illustrated in FIG. 6. Therefore, the description of the hardware configurations of the user terminals 2-1 to 2-n and the external server 3 is omitted.

Figure 7:
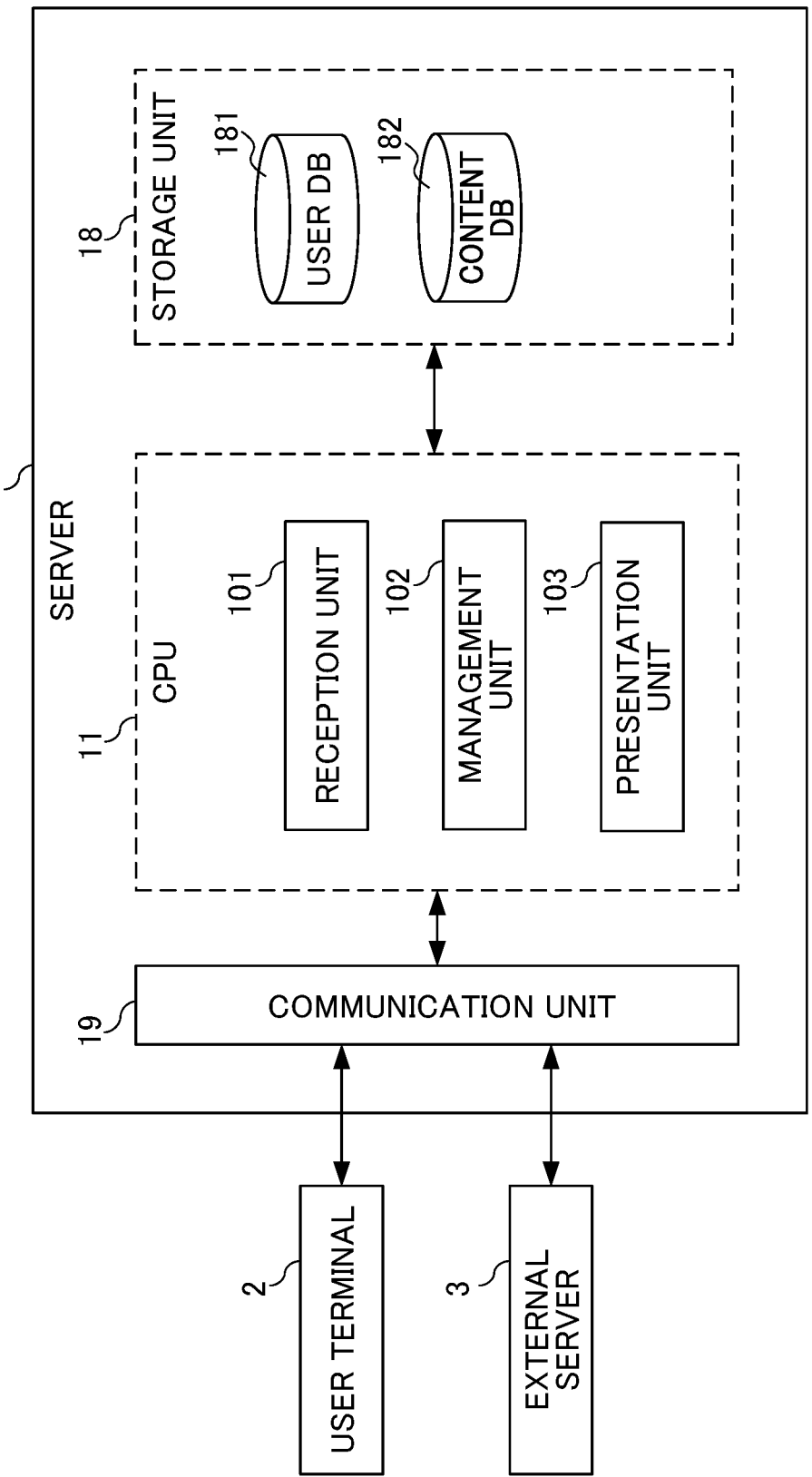
FIG. 7 is a functional block diagram illustrating an example of a functional configuration necessary for controlling content evaluation support processing to be executed by the server in FIG. 6.

Next, a functional configuration of the server 1 having the hardware configuration in FIG. 6 will be described. FIG. 7 is a functional block diagram illustrating an example of the functional configuration necessary for controlling the content evaluation support processing to be executed by the server in FIG. 6.

The "content evaluation support processing" refers to processing necessary for providing the present service described above.

As illustrated in FIG. 7, when the server 1 in FIG. 6 executes the content evaluation support processing, a reception unit 101, a management unit 102, and a presentation unit 103 are caused to function in the CPU 11 of the server 1.

Furthermore, in a region of the storage unit 18 of the server 1, a user database (DB) 181 and a content DB 182 are provided.

The reception unit 101 receives an evaluation on content C by a user U and a recommendation on another content C determined by the user U to be related to the content C. Specifically, for example, in the example in FIG. 1, the reception unit 101 receives an evaluation (a posted review), by the user U2, on the content C1 recommended by the user U1 and a recommendation on the content C2 determined by the user U2 to be related to the content C1.

Furthermore, it is possible that the reception unit 101 allows, only when there is a recommendation on another content C determined by a user U to be related to content C, the user U to evaluate the content C. Therefore, it is possible that, when a user U evaluates (post a review on) content C, the user U has to recommend beforehand another content C. The recommendation is regarded as a prerequisite. As a result, it is possible to increase, in number, posted content C serving as recommendations. It is thus possible to enrich the content DB 182 that accumulates information regarding content C serving as recommendations.

The management unit 102 causes the user DB 181 to store and manage information (hereinafter referred to as "user information") regarding the users U1 to Un who are users of the present service. Furthermore, the management unit 102 causes the content DB 182 to store and manage information (hereinafter referred to as "content information") regarding m (m is an integer value equal to or more than 1) pieces of content C that is recommended or evaluated by the users U1 to Un respectively. The content DB 182 always undergoes data crawling. Therefore, the content information stored in the content DB 182 is always kept up to date. Furthermore, as described above, the content DB 182 does not store data of images indicative of the content C.

Furthermore, the management unit 102 manages information indicative of a user U who has made the evaluation and the recommendation, information indicative of the content C serving as an evaluation, and information indicative of the content C serving as a recommendation in association with each other, the information indicative of a user U, and the information indicative of the content C information indicative of the content C serving as the evaluation, and the information indicative of the content C serving as the recommendation being contained in the content C that is subject to evaluation and the recommendation on content C serving as a recommendation received by the reception unit 101.

On the basis of a mutual correspondence relation among the user information of the user U who has evaluated the content C, the content information of the content C that is subject to evaluation, and the content information of the content C serving as a recommendation, the presentation unit 103 performs processing described below. That is, when a user U accesses the information indicative of the content C that is subject to evaluation, the presentation unit 103 presents, to the user U, at least one piece of information selected from among the user information of the user U who has evaluated the content C, the content information of the content C that is subject to evaluation, and the content information of the content C serving as a recommendation.

Furthermore, on the basis of the correspondence relation between the user information of the user U who has evaluated the content C, the content information of the content C that is subject to evaluation, and the content information of the content C serving as a recommendation, and the user information of the user U who has accessed the information indicative of the content C, the presentation unit 103 presents, to the user U who has accessed the content C that is subject to evaluation, at least one piece of information selected from among the user information of the user U who has evaluated the content C, the content information of the content C that is subject to evaluation, and the content information of the content C serving as a recommendation.

Figure 8:
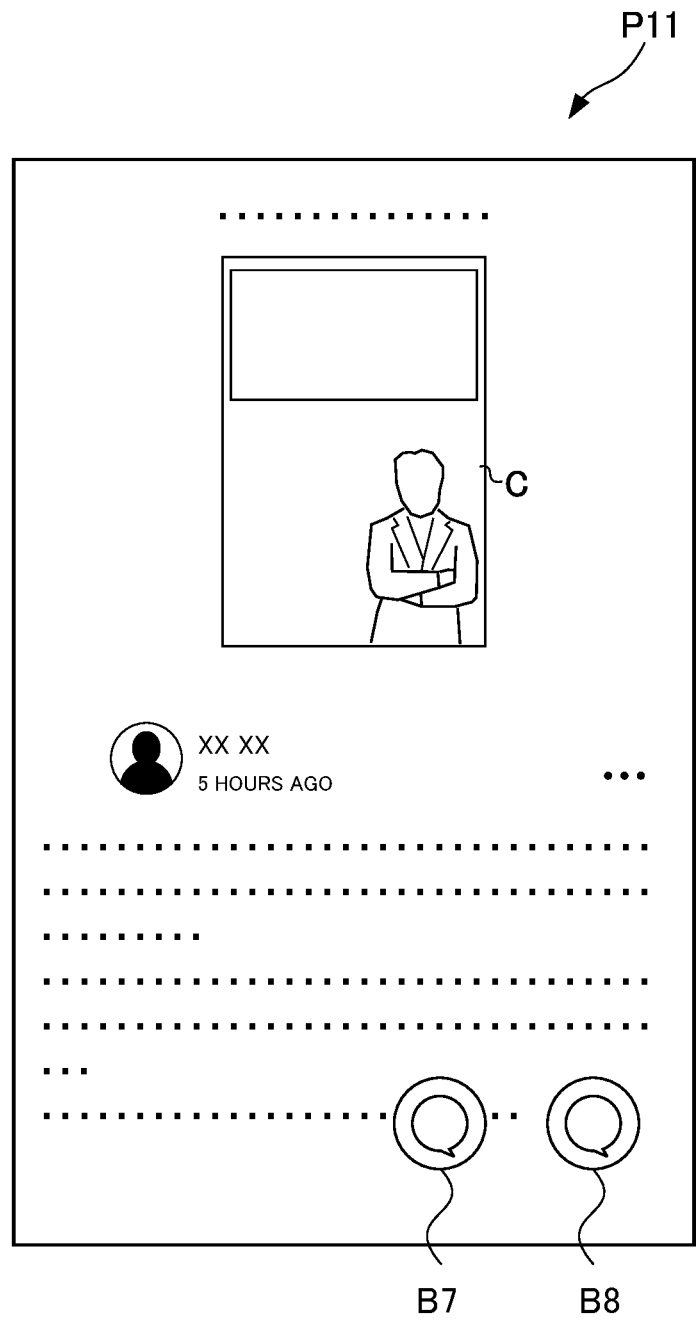
FIG. 8 is a view illustrating a specific example of a GUI that differs in aspect from the GUIs illustrated in FIG. 2.
Figure 9:
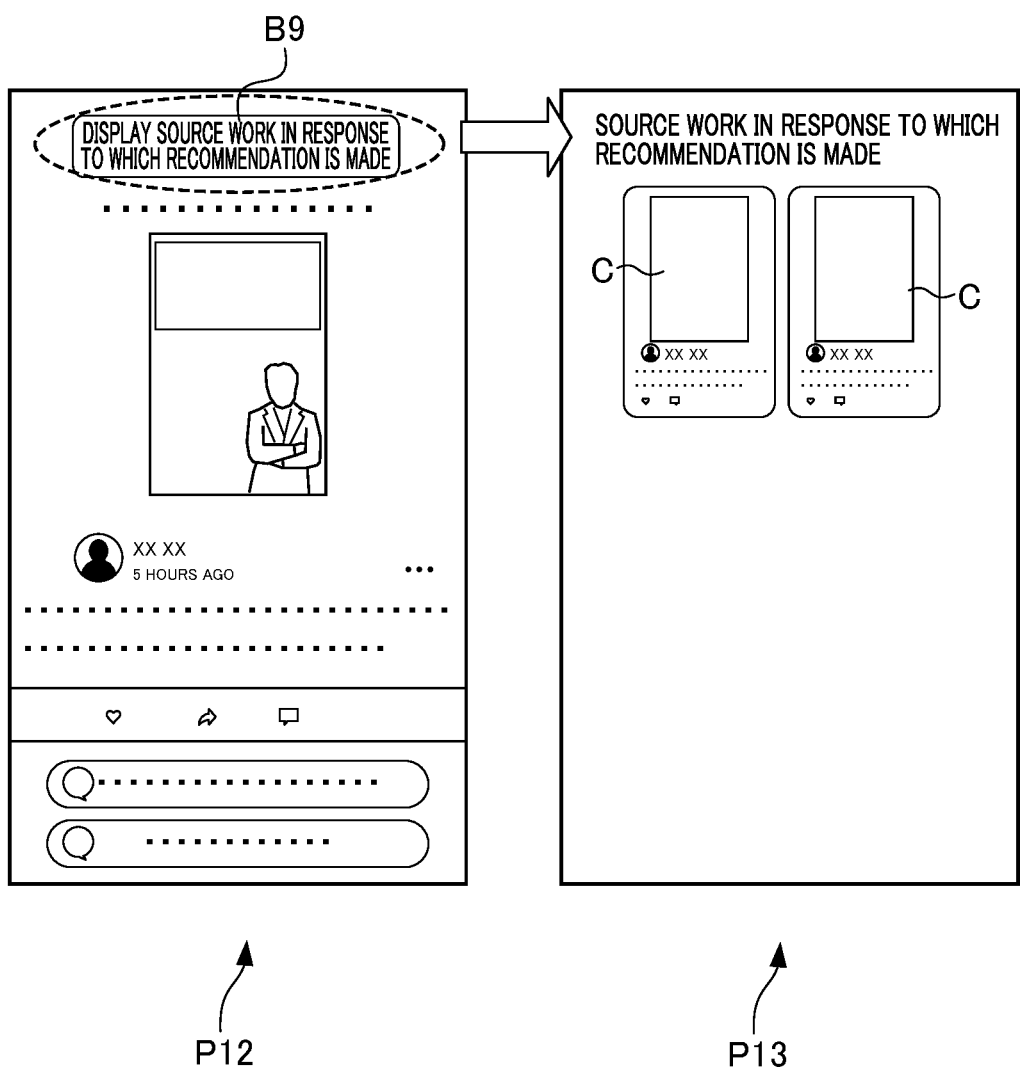
FIG. 9 is a view illustrating a specific example of GUIs that differ in aspect from the GUIs illustrated in FIG. 2.

FIGS. 8 and 9 are views each illustrating a specific example of GUIs that differ in aspect from the GUIs illustrated in FIG. 2.

As described above, in the present service, when the button B4 or B5 provided on the review display page P5 in FIG. 2 is pressed, for example, content C serving as a recommendation is posted. Therefore, it is possible to link content C to each other. As described above, how the buttons B4 and B5 are disposed on the GUI to be displayed on the user terminal is regarded as an important factor. One reason is that, when the buttons B4 and B5 are disposed at appropriate positions on a GUI to be displayed on the user terminal, it is possible to expect that many users U willingly press the buttons B4 and B5. Therefore, content C serving as recommendations, on the basis of a subjective view of a user U, are sequentially accumulated in a predetermined database.

FIG. 8 illustrates a review display page P11 serving as a page corresponding to the review display page P5 in FIG. 2. The review display page P11 is provided with an evaluation (a posted review) on a book (content C), and buttons B7 and B8, respectively. The button B7 and B8 are buttons respectively corresponding to the buttons B4 and B5 on the review display page P5 in FIG. 2. That is, the button B7 is a button to be pressed to recommend related content C. The button B8 is a button to be pressed to recommend the content C displayed on the review display page P11. The buttons B7 and B8 are respectively fixed at predetermined positions on a screen of the user terminal 2. Therefore, even when the user U has performed a scroll operation on the screen displaying the review display page P11, the buttons B7 and B8 are displayed in a fixed state at the positions illustrated in FIG. 8. Therefore, even while the user U is reading what is described in the evaluation (the posted review), the user U is able to recommend the content C without performing an operation of scrolling downward on the screen.

FIG. 9 illustrates a review display page P12 corresponding to the review display page P5 in FIG. 2. Different from the aspect of the review display page P5 in FIG. 2, the review display page P12 illustrated in FIG. 9 is provided with a button B9 indicated as "Display source work in response to which recommendation is made". When the button B9 is pressed, a page P13 indicated as "Source work in response to which recommendation is made" is displayed. The page P13 displays content C (i.e., content C that is subject to evaluation) that are sources in response to which the content C serving as a recommendation is posted. Content C that is a source in response to which content C serving as a recommendation is posted may be one or a plurality, as illustrated in FIG. 9.

Figure 10:
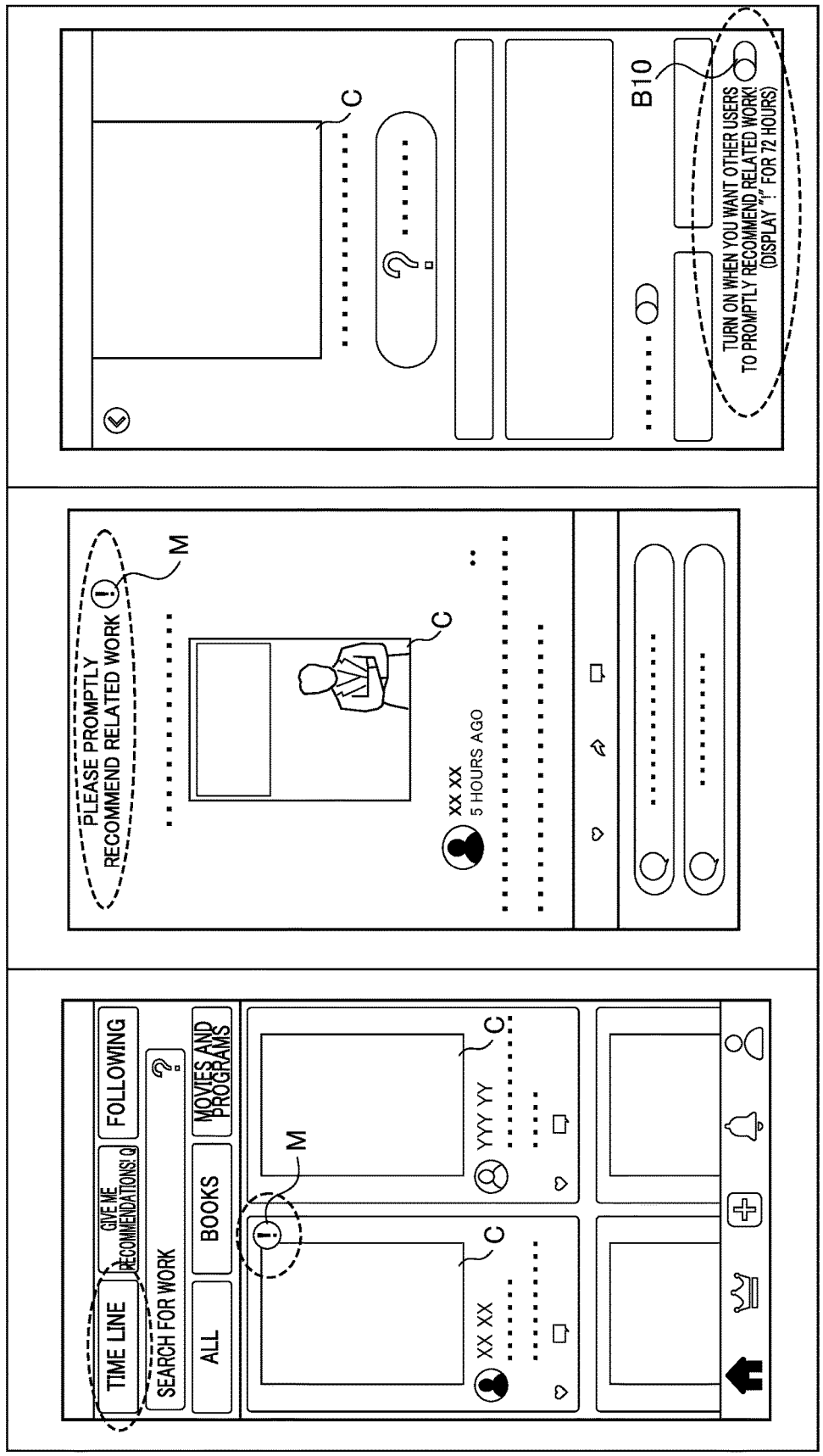
FIG. 10 is a view illustrating a specific example of other GUIs to be displayed on the user terminal.

FIG. 10 is a view illustrating a specific example of other GUIs to be displayed on the user terminal.

FIG. 10 illustrates the specific example of the GUIs when a user U who has evaluated (posted a review on) content C wants other users U to promptly recommend content C relating to the content C.

At a left end in FIG. 10, a search page P14 is illustrated. On the search page P14, a plurality of content C are displayed. To indicate that a user U who has evaluated content C wants other users U to promptly recommend related content C, an exclamation mark (!) M is added at a top right position on the content C. Therefore, when other users U viewing the search page P14 simply find the exclamation mark (!) M at the top right position, the other users U are able to easily know that the user U who has evaluated (posted the review on) the content C wants other users U to promptly recommend related content C.

Furthermore, at a center in FIG. 10, a review display page P15 is illustrated. To indicate that the user U who has evaluated the content C wants other users U to promptly recommend related content C, the exclamation mark (!) M is displayed, together with the indication "Please promptly recommend related work" at an upper portion on the review display page P15.

At a right end in FIG. 10, the evaluation posting page P9 in FIG. 4 is illustrated. A lower portion on the evaluation posting page P9 is provided with a switch button B10 indicated as "Turn on when you want other users to promptly recommend related work! (display "!" for 72 hours)". When the user U who has evaluated the content C wants other users U to promptly recommend content C relating to the content C that the user U has evaluated (posted the review), the user U presses the switch button B10. Therefore, the exclamation mark M is added at the top right position on the content C displayed on the search page P14. Furthermore, at the upper portion on the review display page P15, the exclamation mark (!) M is displayed, together with the indication "Please promptly recommend related work!".

Figure 11:
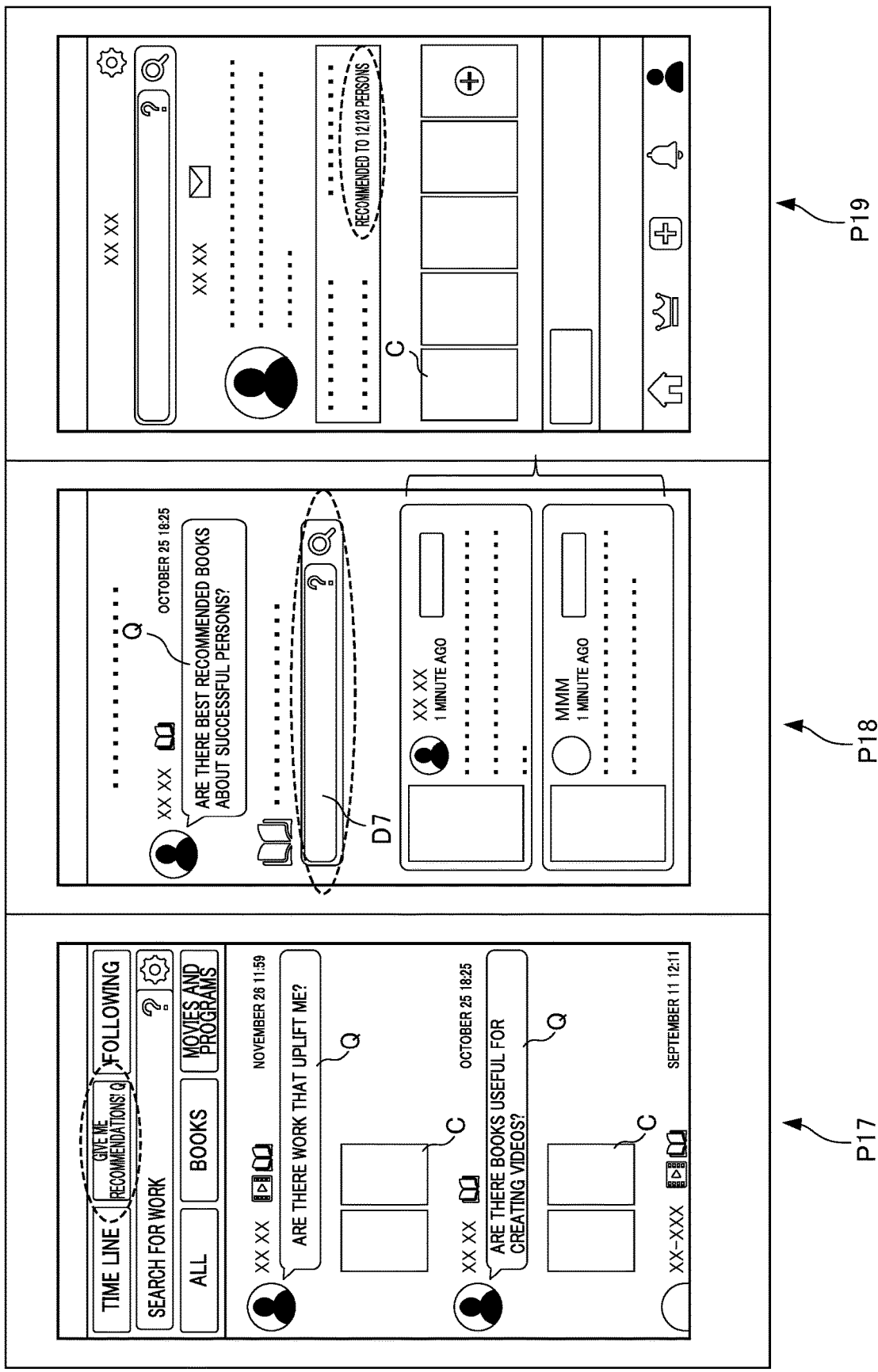
FIG. 11 is a view illustrating a specific example of a service in the present service, where the user is able to send a question to other users, and ask the other users to recommend content C.
Figure 12:
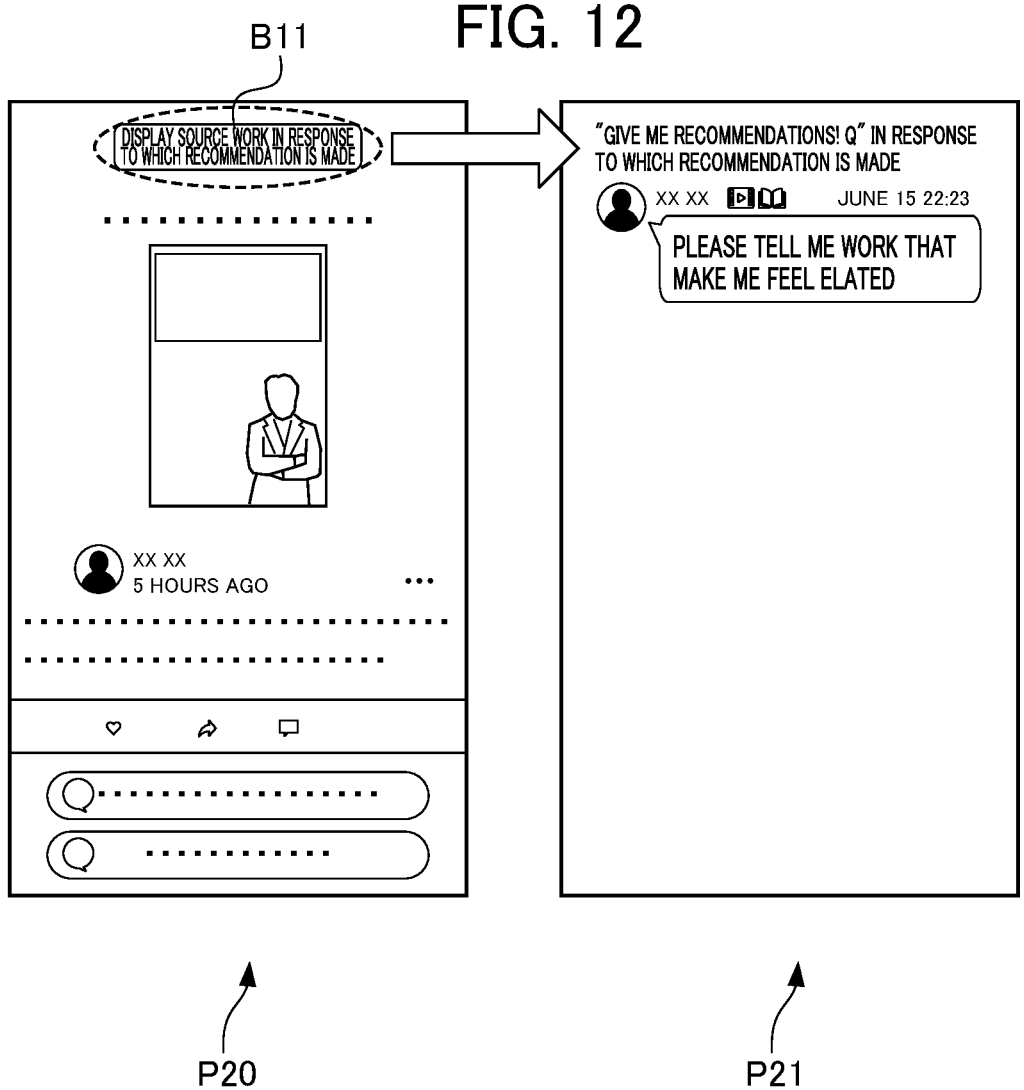
FIG. 12 is a view illustrating a specific example of the service in the present service, where the user is able to send a question to other users, and ask the other users to recommend content C.

FIGS. 11 and 12 are views each illustrating a specific example of the service in the present service, where a user is able to send a question to other users, and ask the other users to recommend content C.

In the present service, it is possible to send a question to other users U, and ask the other users U to recommend work. Such a service as described above will be hereinafter referred to as "Give me recommendations! Q", and will be described below.

At a left end in FIG. 11, a page P17 serving as a home screen of "Give me recommendations! Q" is illustrated. As illustrated in the page P17, below a question Q (for example, "Is there work that uplift me?"), one or more content C recommended by other users U in response to the question Q are displayed. Depending on display settings, recommended content C may be only "books" or only "movies and programs". Furthermore, recommended content C may otherwise be both "books" and "movies and programs". Note that, FIG. 11 illustrates a case where both "books" and "movies and programs" are set (on an upper side) and a case where only "books" is set (on a lower side).

At a center in FIG. 11, a specific example of a page P18 (hereinafter referred to as a "question page P18") to be displayed on the user terminal 2 when an operation of recommending content C is performed in response to a question is illustrated. As illustrated in the question page P18, when a user U recommends content C in response to a question Q (for example, "Are there best recommended books about successful persons?"), the user U enters a search keyword in the entry field D7 displayed below the question Q to search for content C. The content C recommended on the basis of a result of the search are displayed below the entry field D7.

At a right end in FIG. 11, a specific example of a My Page P19 for the user U is displayed. In the My Page P19, as illustrated in an area enclosed by a dotted line, for example, a total count of users U to whom content C have been recommended is indicated in number.

FIG. 12 illustrates a review display page P20 as a specific example of a review display page. The review display page P20 is provided with a button B11 indicated as "Display source work in response to which recommendation is made". When the button B11 is pressed, a page P21 indicated as ""Give me recommendations! Q" in response to which recommendation is made" is displayed. The page P21 displays the question in response to which the content C serving as recommendations are posted. There may be one question, or a plurality of questions, similar to the example in FIG. 12, in response to which content C serving as recommendations are posted.

Figure 13:
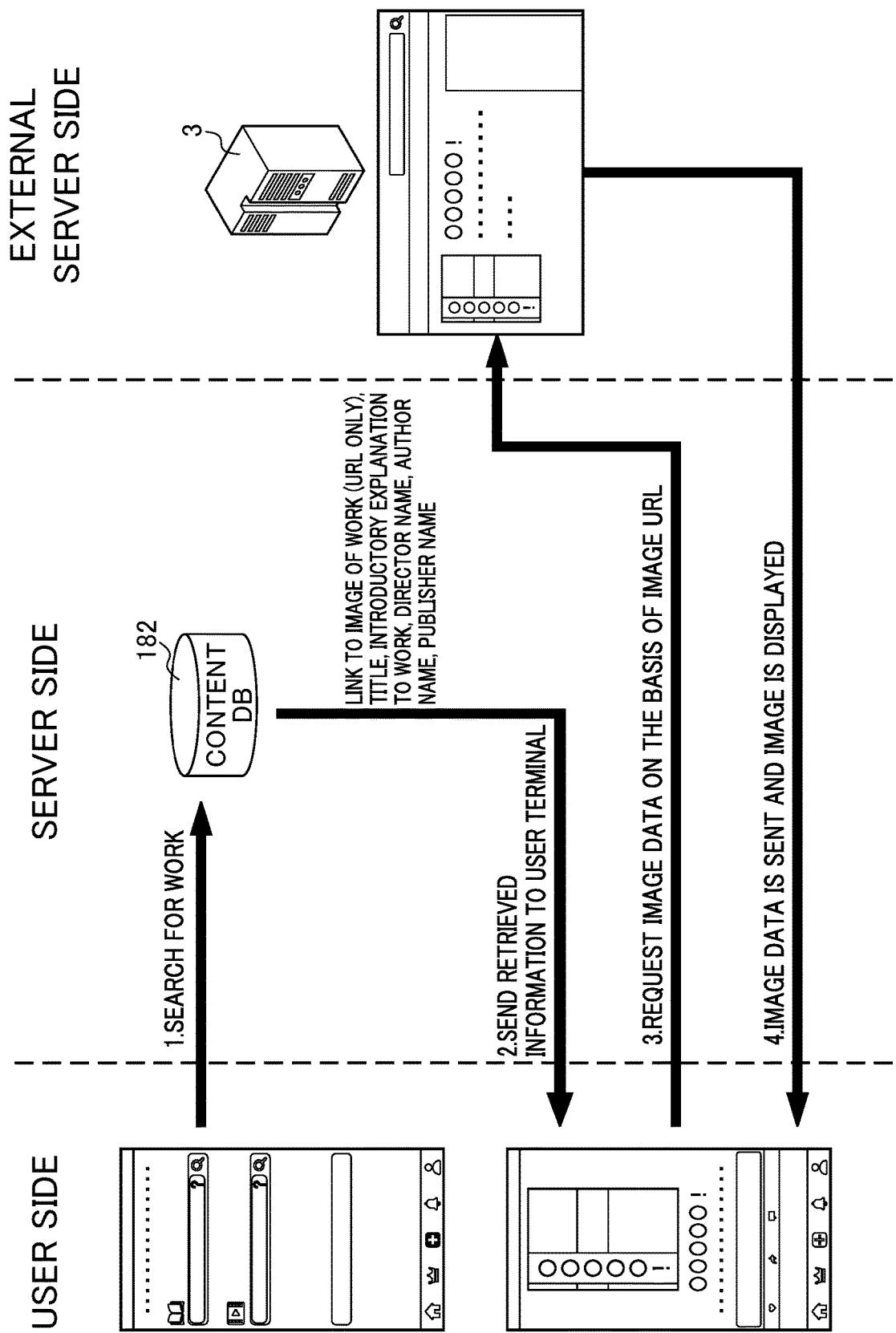
Figure 14:
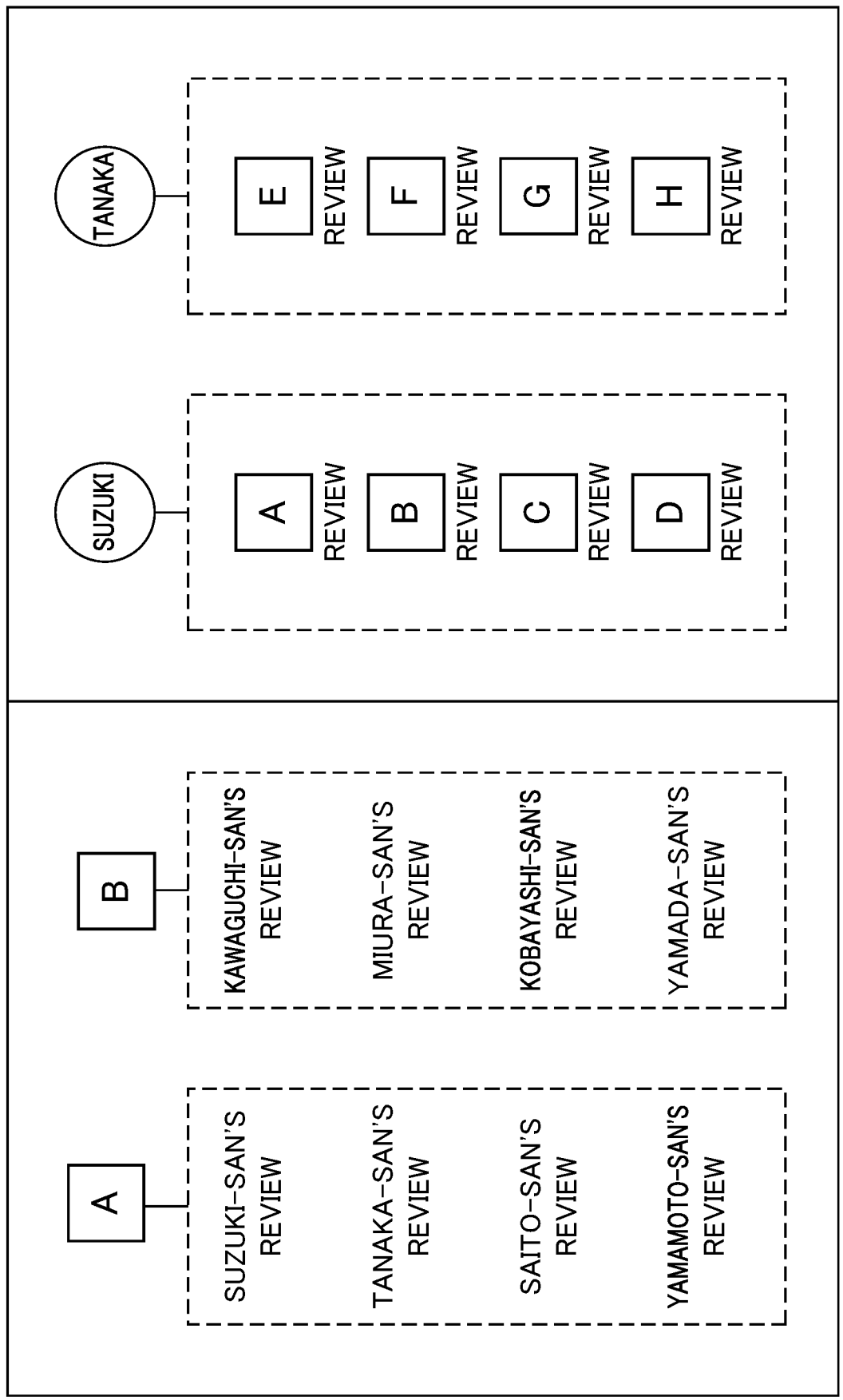
FIG. 14 is a view illustrating details of a conventional service.

FIG. 13 is a view illustrating how the user terminal displays data of an image indicative of content that a user U has searched for.

As illustrated in FIG. 13, (1) when a search for work is performed, (2) information of an author name, for example, in addition to an image URL, a title of content, and an introductory explanation stored in the content DB 182 of the server 1, as described above, are sent to the user terminal 2.

(3) The user terminal 2 accesses the sent image URL to request the external server 3 to send data of an image of the content C.

(4) In response to the request from the user terminal 2, the external server 3 sends the data of the image of the content C to the user terminal 2. Therefore, the user terminal 2 displays the data of the image of the content C.

To summarize those described above, it is possible to achieve those described below with the present service, for example. That is, a plurality of content C are linked to each other through recommendations by the users U. With the content C linked to each other, a user U who has read a book (one of the content C) is able to check other books linked to the book, for example. Therefore, the user U is able to acquire information of the other books, as if the user U has directly been recommended with the other books from other users U. As described above, one biggest feature of the present service is recommendations manually given by users. Therefore, a "real-time" recommend service based on "someone's warmth" is achieved. Furthermore, it is possible to allow applicable categories in the present service to include not only books and movies, but also other various categories such as music, shop information, product sales information, and information available via the Internet.

Furthermore, the user U is able to acquire, from information regarding books recommended by the other users U, information regarding "recommended books, movies, and videos" by the other users U who have made the recommendations, "books, movies, and videos I want", and "books, movies, and videos recommended by others". Note herein that, the information "recommended books, movies, and videos" refers to information regarding books recommended by the other users U who have made the recommendations. Furthermore, "books, movies, and videos I want" refers to information of books and other works that are registered as books and other works the other users U who have made the recommendations each want to read. Furthermore, the information "books, movies, and videos recommended by others" refers to information of books and other work that the others have read and viewed based on the books and other work recommended by other users U. As described above, the user U is able to acquire information regarding reading experiences and viewing experiences of the other users U who have made the recommendations. Furthermore, on the basis of the information, the user U is able to make a determination of whether the user U intends to read one of the books and other work linked through the recommendations.

A specific example of a flow of the present service is summarized below when content C is a "book", "movie", or "video". That is, a user U first performs an input operation on a GUI displayed on the user terminal 2 to make a new membership registration. It is possible to make a new membership registration with a desired E-mail address and a password.

Next, the user U searches for a book, movie, or video that the user U recommends. To make a new recommendation, the user U presses a predetermined icon (for example, an icon indicated as "Recommend").

Next, the user U enters recommendation text, and then presses a predetermined button (for example, a button indicated as "Recommend"). Furthermore, to simply make an addition to a "List I want to read and view" provided per user U, without making a recommendation, the user U presses a predetermined button (for example, a button indicated as "I want to read" or "I want to view"). Furthermore, when the user U wants the other users U to promptly recommend related books and movies, the user U presses a predetermined switch button.

Note herein that it is possible to switch and display a page on the home screen displayed on the user terminal 2 among "Time Line", "Following", and "Popular". The page "Time Line" displays, in a real-time manner, data of images indicative of books, movies, and videos recommended by all the users U. The page "Following" displays, in a real-time manner, data of images indicative of books, movies, and videos recommended by users U to whom the user U is following as "friends". The page "Popular" displays, in a real-time manner, data of images indicative of books, movies, and videos that have received most recommendations or for which a "Like!" button was pressed during a predetermined period of time (for example, one month). Furthermore, it is possible to display a ranking. As to a ranking of individual users, it is possible to display, for example, a comprehensive ranking of all the users U based on a total number of recommended books, movies, or videos or a total number of the "Like!" indications. Furthermore, as to a ranking of books, movies, or videos, it is possible to display, for example, each comprehensive ranking based on a total number of the users U who have made recommendations or a total number of related and recommended books, movies, or videos. It is also possible to classify the books, movies, and videos displayed as described above into a plurality of category types, and to display the classified books, movies, and videos. Therefore, the user U is able to set a tag to freely create a category such as "Books that cheer up readers while commuting", for example.

A book recommended by the user U is added to the My Page for the user U. It is also possible to cause the My Page to display in a segmented manner books, movies, and videos. When the user U taps on data of an image indicative of one of the books, movies, and videos displayed on the My Page, only information of the one of the books, movies, and videos, for which tapping has been made, is displayed. On the displayed page, only "recommended books relating to the book" are displayed. When data of an image indicative of one of the books, movies, and videos, or its text portion is tapped, the text is then wholly displayed. Furthermore, the so-called "Like!" button that the user U may press is provided.

Next, the user U performs an operation of buying a displayed book, movie, or video, an operation of recommending a related book, movie, or video, or an operation of recommending a displayed book, movie, or video. Furthermore, the user U searches for a book, movie, or video that the user U recommends. Next, the user U enters text for recommending the book, movie, or video that the user U recommends. Below an image indicative of the original book, movie, or video recommended by the user U, images indicative of recommended books, movies, or videos relating to the book, movie, or video that the user U has recommended are displayed. Furthermore, the image is added to a library in the My Page for the user U who has made the recommendation. The image is further added to the time line. The user U who has made the recommendation is also able to recommend a related book, movie, or video.

When the user U wants to read later a book recommended by another user U and displayed on the time line, for example, the user U presses a predetermined button (for example, a button indicated as "Add to a list I want to read").

To share a list of recommended books (hereinafter referred to as a "library") displayed on the My Page for another user U, the user U presses a predetermined button (for example, a button indicated as "Add to a library"). Therefore, the library of the other user U is added to and displayed on the My Page. Therefore, the user U is able to segment and share books, movies, and videos. So to say, it is possible to share a whole book shelf of another user U.

When the user U presses a predetermined button (for example, a button indicated as "Share"), the user U is able to directly introduce a book, movie, or video to another user U. It is possible to utilize the service when a counterpart user U has no related book, movie, or video. When a notification about the introduction is sent to the counterpart user U, and the counterpart user U accepts the notified introduction, the introduced book, movie, or video is then added in a "list to read and view". Furthermore, it is possible to search for another user U to whom sharing has been made. It is then possible to allow a notification to be made to the other user U.

Recommended books, movies, or videos are displayed in a list on the My Page. The My Page displays a total number of recommended books, movies, or videos, for example. Pressing a predetermined button (for example, a button indicated as "Hide") makes it possible to individually hide a book, movie, or video.

An example of a business model to which the present service is applied will now be described herein. According to what is described below with reference to an example of selling books and videos that are examples of content C, it is possible to link a book recommended by a user U to a sales page such as Amazon (registered trademark). Therefore, the service provider (not illustrated) is able to earn sales commission fees. Furthermore, a user U who has made a recommendation is able to sell books and videos that the user U owns (to sell used books). In this case, the user U who has made a recommendation is able to receive a partial payment of a sales amount. Furthermore, the service provider (not illustrated) is able to earn a sales commission fee. Furthermore, when the service provider (not illustrated) has allowed a banner advertisement to be displayed in the App, the service provider is able to earn an advertisement fee. Furthermore, when the service provider (not illustrated) has allowed an article advertisement provided from a publisher to be displayed on a "news" field in the App, the service provider is able to earn an advertisement fee.

Furthermore, in the present service, a "report" system provides a "report" to the service provider (not illustrated) when a user U having a malicious intention appears. As a result, an account of such a user U may be banned. Furthermore, in the present service, various types of information are made public in general. However, a private setting is available for users U who want to keep it secret. In this case, content C recommended by a user U with the private setting is made public to only a friend or a follower. In this case, the content C is not displayed on the time line.

Although the embodiment of the present invention has been described, the present invention is not limited to the embodiment described above. The present invention still includes amendments and modifications, for example, that fall within the scope of the present invention, as long as it is possible to achieve the object of the present invention.

For example, in the embodiment described above, the present invention is applied to a case where content such as a book or movie serves as a recommendation. However, the present invention is not limited to the case. The object of the present invention is to successively link related information from a start point where one piece of information is present, to enrich a database, and to make it easy to grasp the related information. Therefore, application targets to which it is possible to apply the present invention include information belonging to various fields, such as cosmetics, restaurants, traveling, music, news articles, research papers, and memorandums.

Furthermore, for example, the embodiment described above has introduced the configuration whereby how pieces of information are linked to each other is grasped in a two dimensional manner. However, the present invention is not particularly limited to such a configuration whereby how pieces of information are linked to each other is grasped in a two dimensional manner. For example, a technology based on virtual reality (VR) may be used to make it easy to grasp in a three dimensional manner how pieces of information are linked to each other. Therefore, it is possible to stereographically see how pieces of information are linked to each other, further making it easy to grasp related information.

Furthermore, one feature of the embodiment described above is that pieces of information "manually given by users" are linked to each other. However, it is possible to at least partially apply a technology based on artificial intelligence (AI) to the present invention. Therefore, for example, it is possible that a user U knows, via a notified E-mail, other users U who have a tendency of preference identical to a tendency of preference of the user U, because the technology based on AI that is trained to do so has selected the other users U. Furthermore, it is possible that the technology based on artificial intelligence (AI) lets a user U know, via a notified E-mail, a recommended result on content C.

Furthermore, the system configuration illustrated in FIG. 5 and the hardware configuration of the server 1 illustrated in FIG. 6 are mere examples for achieving the object of the present invention. The present invention is not particularly limited to those configurations.

Furthermore, the functional block diagram illustrated in FIG. 7 is a mere example. The present invention is not particularly limited to the functional block diagram illustrated in FIG. 7. That is, it is enough that an information processing system has functions that make it possible to execute the series of processing described above. Functional blocks used to achieve the functions are not particularly limited to the functional blocks illustrated in the example in FIG. 7.

Furthermore, locations at which the functional blocks are present are not limited to the locations in FIG. 7. Desired locations may be selected. For example, in the example in FIG. 7, the functional blocks necessary for executing the content evaluation support processing are those disposed on the server 1 side. However, the configuration is a mere example. At least some of the functional blocks may be disposed on the user terminal 2 side. Furthermore, single hardware may configure one functional block. Single software may configure one functional block. A combination of hardware and software may configure one functional block.

To execute, with software, processing of each functional block, a program configuring the software is installed into a computer from a network or a recording medium, for example. The computer may be a computer incorporated in a special hardware. Furthermore, the computer may be such a computer installed with various types of programs used to execute various types of functions, such as, in addition to servers, general-purpose smart phones and personal computers.

A recording medium storing such programs as described above may not only be a removable medium distributed separately from a device main body to provide the programs to each user, but also be a recording medium provided to each user in a state where the recording medium is assembled beforehand in the device main body, for example.

Note that, in the present specification, steps describing programs recorded in a recording medium include not only processes sequentially executed in a chronological order, but also processes that may not necessarily be executed in a chronological order, but may be executed in parallel or separately.

Furthermore, in the present specification, the term system means a generic apparatus including a plurality of devices and a plurality of means, for example.

To summarize those described above, it is enough that the information processing device to which the present invention is applied takes a configuration as described below. The information processing device may still take one of various embodiments. That is, the information processing device to which the present invention is applied includes: reception section (for example, the reception unit 101) that receives an evaluation (for example, an evaluation by the user U2 on the content C1 in FIG. 1) on first content (for example, the content C1 recommended by the user U1 in FIG. 1) by a first user (for example, the user U2 in FIG. 1), and a recommendation (for example, a recommendation on the content C2 by the user U2 in FIG. 1) on second content determined by the first user to be related to the first content; management section (for example, the management unit 102) that manages first user information indicative of the first user (for example, user information of the user U2 in FIG. 1), first content information indicative of the first content (for example, content information of the content C1), and second content information indicative of the second content (for example, content information of the content C2) in association with each other, the first user information, the first content information, and the second content information being contained in the evaluation and the recommendation received by the reception section; and presentation section (for example, the presentation unit 103) that presents, when a second user (for example, the user U3 in FIG. 1) accesses the first content, to the second user, at least one piece of information selected from among the first user information, the first content information, and the second content information, on the basis of a mutual correspondence relation among the first user information, the first content information, and the second content information managed by the management section.

Therefore, an evaluation on the first content by the first user, and a recommendation on the second content determined by the first user to be related to the first content are received. The first user information, the first content information, and the second content information are managed in association with each other. On the basis of the mutual correspondence relation among the first user information, the first content information, and the second content information, the pieces of information are then presented to the second user, when the second user accesses the first content. As a result, it is possible to construct a system that successively links one piece of information (for example, the first content information) to related information (for example, the second content information).

Furthermore, it is possible that the reception section receives the evaluation by the first user only when the first user has made the recommendation.

Therefore, it is possible that, when a user evaluates content, the user has to recommend beforehand another content as a prerequisite. As a result, it is possible to increase, in number, posted content serving as recommendations. It is thus possible to enrich a database that accumulates information regarding content serving as recommendations.

Furthermore, it is possible that the management section further manages second user information indicative of the second user (for example, user information of the user U3), and the presentation section presents, to the second user, at least one piece of information selected from among the first user information, the first content information, and the second content information, on the basis of a correspondence relation (for example, a friendship by following respective accounts with each other) among the first user information, the first content information, and the second content information, and the second user information managed by the management section.

Therefore, the user is able to receive presented information regarding those recommended by friends as other content relating to content that is subject to evaluation.

PREFERRED MODE FOR CARRYING OUT THE INVENTION

1: Server, 2, 2-1 to 2-n: User terminal, 3: External server, 11: CPU, 12: ROM, 13: RAM, 14: Bus, 15: Input-and-output interface, 16: Input unit, 17: Output unit, 18: Storage unit, 19: Communication unit, 20: Drive, 40: Removable medium, 101: Reception unit, 102: Management unit, 103: Presentation unit, 181: User DB, 182: Content DB, C: Content, U1 to Un: User, P: Page, D: Entry field, B: Button, M: Exclamation mark (!), Q: Question, N: Network

The invention claimed is:

1. An information processing device comprising a processor, the processor being configured to:
   search for one or more contents associated with first information when the first information is input, the first information being associated with a content that a first user having a first terminal wishes to recommend;
   select a predetermined content as a first content that the first user wishes to recommend, in a case in which the first user performs an operation on the first terminal to designate the predetermined content from the one or more contents associated with the first information; and
   receive an input of first evaluation information on the first content by the first user operating the first terminal, as triggered by selection of the first content, and generate a first screen for presenting information that pairs the first user and the first content as a unit including the first evaluation information; wherein
   the processor is further configured to:
   search for one or more contents associated with second information when the second information is input, the second information being associated with a content that a second user having been presented with the first screen via a second terminal wishes to recommend;
   select a predetermined content as a second content that the second user wishes to recommend, in a case in which the second user performs an operation on the second terminal to designate the predetermined content from the one or more contents associated with the second information;
   receive an input of second evaluation information on the second content by the second user operating the second terminal, as triggered by selection of the second content, generate a second screen for presenting information that pairs the second user and the second content as a unit including the second evaluation information; and add link information for the second screen to the first screen, wherein the processor is further configured to:

generate a first search result page presenting the searched one or more contents associated with the first information on the first terminal in response to the input of the first information, and generate a second search result page presenting the searched one or more contents associated with the second information on the second terminal in response to the input of the second information; and generate the first screen based on the first evaluation information input by the first user and to generate the second screen based on the second evaluation information input by the second user;

wherein the first terminal and the second terminal each include a graphic user interface (GUI), and in a display screen for the GUI, the processor is configured to provide at least one selection area necessary as a premise for inputting the first information or the second information.

2. The information processing device according to claim 1, wherein the processor adds the link information to the first screen, as classified based on whether the second user having recommended the second content is an evaluator having inputted the first evaluation information or a person following the evaluator.

3. The information processing device according to claim 1, wherein the first terminal and the second terminal are smartphones.

4. The information processing device according to claim 1, wherein the processor is further configured to:

receive a first input when the first user performs the operation on the first terminal to designate the predetermined content from the one or more contents associated with the first information;

select the first content in response to receiving the first input;

receive a second input when the second user performs the operation on the second terminal to designate the predetermined content from the one or more contents associated with the second information; and select the second content in response to receiving the second input.

5. The information processing device according to claim 1, wherein the selection area is fixedly displayed as scroll inoperable in a scroll operable display screen.

* * * * *